United States Patent Office 3,056,651
Patented Oct. 2, 1962

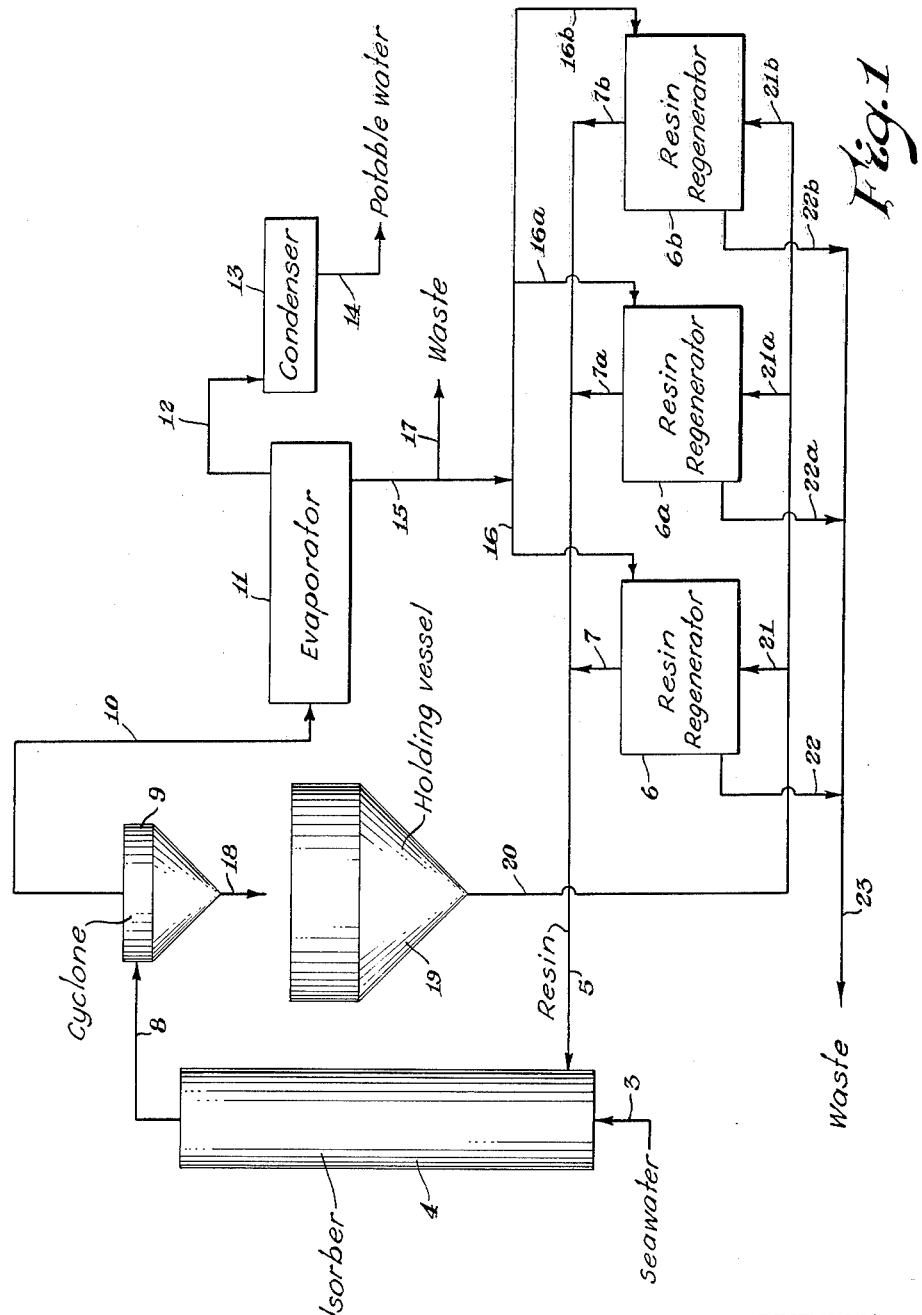

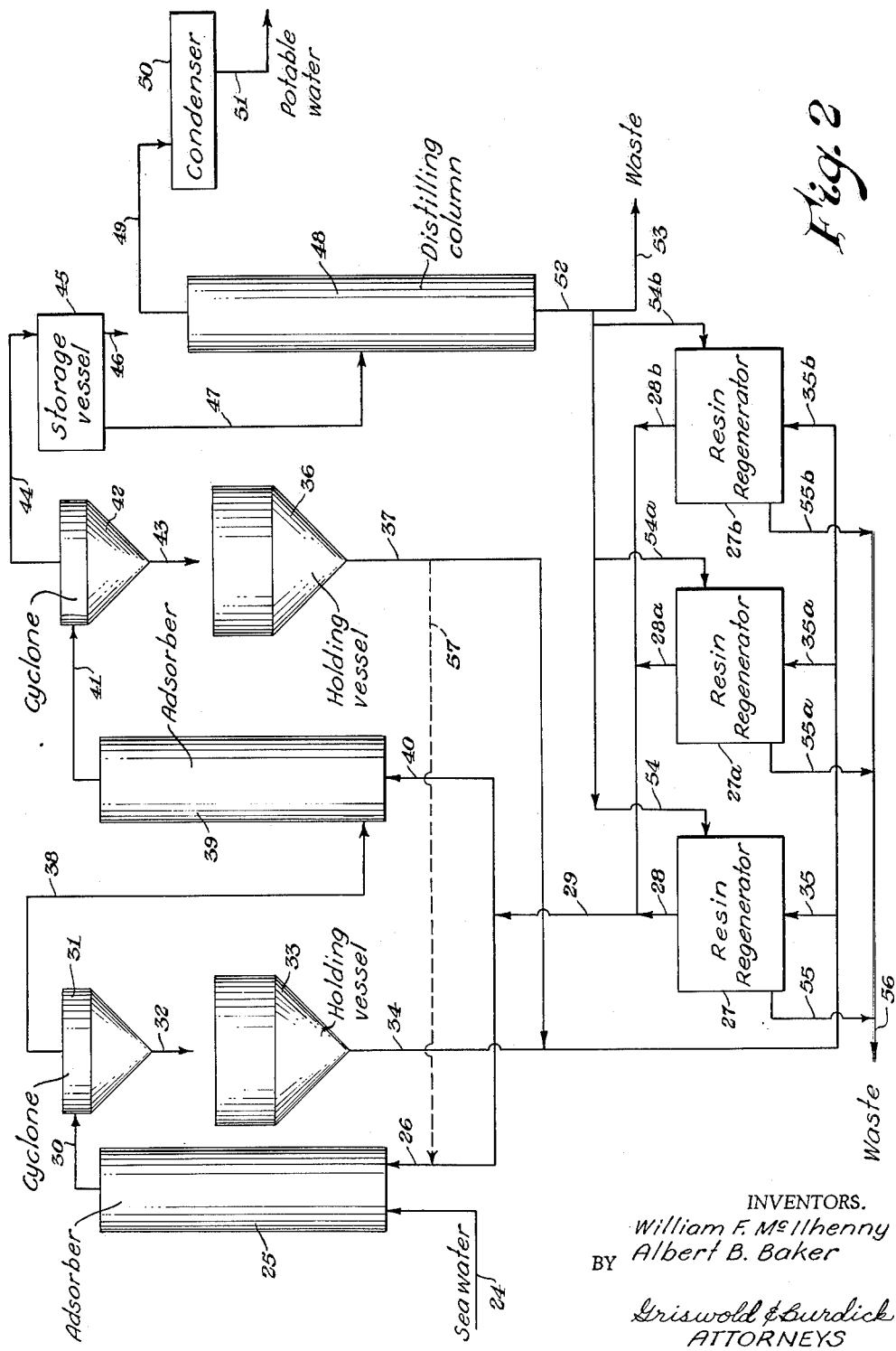

3,056,651
METHOD FOR MAKING POTABLE WATER AND MAGNESIUM CHLORIDE FROM SEA WATER
William F. McIlhenny, Lake Jackson, and Albert B. Baker, Freeport, Tex., assignors to The Dow Chemical Company, Midland, Mich., a corporation of Delaware
Filed Dec. 11, 1958, Ser. No. 779,568
8 Claims. (Cl. 23—91)

This invention concerns a method for making potable water from sea water or other brackish water having a salinity and hardness caused by inorganic salts of calcium and magnesium, together with a relatively large proportion of one or more alkali metal salts such as sodium chloride, which render the water unfit for household or industrial uses.

The obtaining of fresh or potable water for household, industrial, agricultural or irrigation purposes is becoming of increasing importance in many areas throughout the world. For example, many coastal areas which have a limited fresh water supply or are dependent upon rainfall as a source of fresh water are capable of agricultural, industrial or recreational development provided that potable water could be made available in adequate supply and at a reasonable cost.

It is known that potable water can be produced from sea water by treating the sea water with ion exchange resins, but such method for making potable water in quantities that are required for industrial or household uses has not heretofore been economically possible.

It has been proposed to distill sea water to obtain a condensate of potable or fresh water, but such method is also costly and has the disadvantage that calcium and magnesium salts in the sea water tend to precipitate and deposit as scale upon heat transfer surfaces of the equipment, which results in frequent shut down for descaling and repair, and adds to the cost of the operations.

It is a primary object of the invention to provide a novel method for making potable water from sea water at an economical cost and in large quantities. Another object is to provide a novel method for making fresh water from sea water which comprises treating sea water with a combination of integrated operations each of which contributes to the overall production of potable water in an economical manner. Still another object is to provide a method of making potable water from sea water by a combination of integrated operations comprising the use of a cation exchange resin to soften the saline water, which avoids scaling of the equipment in a subsequent distilling operation. Other and related objects may appear from the following description of the invention.

According to the invention fresh or potable water can readily and economically be produced from sea water or other brackish water containing salinity and hardness due to dissolved inorganic salts of calcium and/or magnesium, together with a relatively large proportion of alkali metal salts such as sodium chloride, which render the water unfit for drinking, household or many industrial uses, by a method which consists in a plurality of integrated operations comprising: (a) softening the water by removing at least a portion of the calcium and magnesium therefrom with a cation exchange resin; (b) distilling the softened water to obtain a condensate of potable water and a relatively concentrated solution of alkali salts as residue; (c) employing the residue alkali salt solution alone, or fortified with alkali metal salt, e.g. sodium chloride, to regenerate the cation exchange resin employed in the process to a form suitable for sorbing a further quantity of calcium and/or magnesium ions from another supply of the saline water; and (d) repeating the cycle of operations.

The invention is described more particularly with reference to the accompanying drawings wherein:

FIG. 1 is a diagrammatic flow sheet showing an arrangement of the principal major elements of apparatus suitable for practice of the invention, and FIG. 2 is a diagrammatic flow sheet of another arrangement of the principal major elements of apparatus suitable for practice of the invention.

In carrying out the process for making potable water from sea water or brackish water having a mixture of inorganic salts comprising a major proportion of alkali metal salts and a minor proportion of at least one water-hardening metal salt selected from the group consisting of calcium and magnesium salts, dissolved therein which render the water unfit for drinking or household or manufacturing purposes, the water, e.g. sea water, is fed via a conduit 3 into an adsorbing zone such as a column 4 and into admixture with a granular cation exchange resin in a form such as the sodium salt form which sorbs calcium and magnesium ions from the sea water. The cation exchange resin is fed into column 4 via a conduit 5 as a flowable aqueous slurry of the cation exchange resin particles and water, e.g. as a slurry consisting of from 40 to 60 parts by volume of the resin particles and from 60 to 40 parts by volume of water per 100 parts by volume of the slurry. The cation exchange resin is withdrawn as a slurry of the resin particles and aqueous liquid from one of the regenerator units 6, 6a or 6b and is passed via conduits 7, 7a or 7b and conduit 5 into column 4 and into admixture with the water to be treated entering the column via conduit 3, and in proportions such as to form an aqueous suspension in the adsorption column 4 consisting of from 5 to 10 parts by volume of the resin particles and from 95 to 90 parts by volume of aqueous liquid per 100 parts by volume of the suspension. The mixture of the sea water and the cation exchange resin is continuously flowed away from the point of mixing in column 4 at a rate which maintains the cation exchange resin particles suspended in the aqueous liquid while at the same time the resin sorbs calcium and magnesium ions from the water. The mixture is discharged from column 4 and passed via conduit 8 into a hydraulic cyclone 9 wherein softened sea water is separated from the cation exchange resin particles and is passed via conduit 10 into evaporator 11. The softened sea water is subjected to a distilling operation in evaporator 11, whereby vapors of the water are passed overhead via conduit 12 to condenser 13 to obtain a potable condensate which is withdrawn through conduit 14 and passed to storage or point of use. The proportion of the softened sea water that is distilled in evaporator 11 and condensed as potable water will vary depending upon the concentration of the inorganic salts in the sea water starting material. In general, the softened sea water is distilled or concentrated by evaporation so as to leave an aqueous liquid residue containing a total of from about 5 to 10, preferably from 7 to 10, percent by weight of water-soluble alkali metal salts, e.g. sodium chloride, dissolved therein. The liquid saline residue is continuously withdrawn from evaporator 11 and passed via conduits 15 and 16, 16a or 16b into one or another of the regenerator units 6, 6a, or 6b or it can be passed to waste via conduit 17. For purpose of regenerating the cation exchange resin, the residue solution can be enriched by adding sodium chloride thereto to form a concentrated or saturated aqueous solution, e.g. a solution containing from 15 to 26 percent by weight of sodium chloride, but it is not required.

The cation exchange resin particles which are separated from the softened sea water in hydraulic cyclone 9 are discharged from said cyclone through an outlet 18, together with a portion of the softened water, and fed into holding vessel 19. From vessel 19, the cation exchange resin is passed via conduits 20 and 21, 21a or 21b into regenerators 6, 6a, or 6b.

The regenerators 6, 6a and 6b are preferably employed as a plurality of at least three similar vessels so that one of the vessels serves as a holding vessel from which regenerated cation exchange resin is continuously being withdrawn and passed via conduit 7, 7a or 7b and inlet 5 into adsorbing column 4 and another of the regenerators 6, 6a or 6b is being continuously filled with used cation exchange resin fed thereto from holding vesel 19 via conduits 20 and 21, 21a or 21b. The cation exchange resin in the third or remaining regenerator is regenerated to the alkali metal salt form by passing the liquid saline residue withdrawn from evaporator 11 through conduit 15 and passed via conduit 16, 16a or 16b into contact with the resin in said regenerator and passing the effluent liquid to waste via conduits 22, 22a or 22b and conduit 23.

The process just described is carried out in continuous manner, it being understood that suitable valves, pumps and other control means not shown, but usually employed in the art, are placed in the appropriate places to control and regulate the flow of materials as desired in the process.

The cation exchange resin to be employed in the process can be any insoluble infusible resinous cation exchange resin containing carboxylic acid groups or sulfonic acid groups as the active groups of the same, such as the insoluble copolymers of methacrylic acid and divinylbenzene, sulfonated phenolformadehyde resins, sulfonated coal or sulfonated insoluble cross-linked vinyl aromatic resins such as sulfonated copolymers of styrene and divinylbenzene. Such cation exchange resins are known to the art and are available commercially. The cation exchange resin can be used initially in the hydrogen or the alkali metal salt form, but is usually employed in the sodium salt form. The cation exchange resin can be in particles of sizes which vary from about 10 to about 200 mesh per inch as determined by U.S. standard screens.

The water to be employed in the process can be sea water or brackish water having from about 50 to 100 percent salinity. The term "salinity" employed herein pertains to the proportions of sodium chloride and calcium and magnesium in the form of inorganic salts dissolved in a given amount of the water. The term "100 percent salinity" refers to sea water containing 18,900 parts by weight of chloride, 480 parts by weight of calcium and 1272 parts by weight of magnesium per million parts by weight of the sea water. Sea water of 50 percent salinity contains one-half the amounts of chloride, calcium and magnesium stated above per million parts by weight of the water.

In carrying out the process, the cation exchange resin can be recycled in the absorption zone for a plurality of times, but the resin is advantageously and more efficiently employed by contacting the resin with the water to be softened in a single absorption step, then passing the resin to the regenerating zone and regenerating the used resin particles to the alkali metal salt form and thereafter re-employing the regenerated cation exchange resin in the process for sorbing calcium and magnesium ions from the water to be treated. In its practical application the water to be treated is continuously contacted with a body of the cation exchange particles of which from 85 to 100 percent of the particles are in a form suitable for sorbing calcium and/or magnesium ions from the water, and conversely, when about 15 percent or less of the cation exchange resin particles are converted to the calcium and/or magnesium salt form, the body of the used cation exchange resin is continuously being passed to the regenerating zone wherein the used resin particles are regenerated to the alkali metal salt form by contact with the aqueous saline residue solution withdrawn from the evaporator or distilling zone and containing alkali metal salts, e.g. sodium chloride, in a concentration between about 5 and 10 percent by weight of the residue solution.

The proportion of the calcium and/or magnesium to be removed from the raw feed water will vary depending in part upon the relative proportions of calcium, magnesium and alkali metal salts in the water to be treated. For sea water or other brackish water it is important to lower the calcium and/or magnesium content of the water to a value such that the softened water can be distilled to obtain a potable condensate and leave a liquid residue containing alkali metal salts in a concentration between about 5 and 10 per cent by weight of the solution, together with either calcium or magnesium or both calcium and magnesium salts, in a concentration which is lower than the limit of the solubility of the calcium and/or magnesium salts in the aqueous alkaline saline solution. The solubility of inorganic salts of calcium and magnesium in the residue obtained by distilling sea water is shown in graphs described in a publication by W. F. Langelier et al. in Ind. & Eng. Chem., volume 42, No. 1, pages 126–130 (1950). Thus, knowing the proportions of calcium, magnesium and alkali metal salts in the feed water, and the limits of the solubility of the calcium and magnesium salts in the residue solution and the concentration of alkali metal salts to be maintained in the residue solution, it is a simple matter to calculate the proportion of the calcium and/or magnesium to be removed from the feed water and the proportion of the softened water to be distilled as potable condensate in order to obtain a residue solution containing alkali metal salts in a concentration between about 5 and 10 percent by weight of the solution, which is the preferred concentration of alkali metal salts for regenerating the used cation exchange resin to the alkali metal salt form, and to avoid the precipitating of insoluble calcium and/or magnesium salts as scale in the evaporator or distilling zone.

The sea water or other brackish water to be softened is preferably treated in a plurality of similar adsorption steps with the cation exchange resin in order to lower the concentration of the calcium and/or magnesium in the softened water to a value which is appreciably lower than the limiting solubility of the calcium and/or magnesium salts in the residue remaining when from one-half to two-thirds of the softened water has been distilled to obtain a potable condensate. In general, lowering the concentration of the calcium and/or magnesium in the raw sea water to a value such that the softened water contains a total of not more than 100 parts by weight of calcium and about 700 parts by weight of magnesium, or 800 parts by weight of both calcium and magnesium, per million parts by weight of the softened water, is satisfactory to avoid the formation of scale or other insoluble precipitate, when the softened sea water is subsequently distilled or evaporated to obtain from one-half to two-thirds of the water as potable condensate and correspondingly from one-half to one-third of the water as a residue containing from 5 to 10 percent by weight of alkali metal salts, e.g. sodium chloride.

In a preferred practice for making potable water from sea water employing an arrangement of the principal major elements of apparatus as shown in FIG. 2 of the drawing sea water is fed via a conduit 24 into an absorption column 25 and into admixture with particles of a cation exchange also fed to column 25 via a conduit 26. The cation exchange resin is withdrawn from one of the regenerators 27, 27a or 27b and is fed, suitably as a slurry consisting of from 40 to 60 percent by volume of the cation exchange resin particles and from 60 to 40 percent by volume of water, via conduits 28, 28a or 28b and conduits 29 and 26 into column 25. The cation exchange resin and the sea water are fed to column 25 in proportions such as to form an aqueous suspension in said column consisting of from 5 to 10 parts by volume of the resin particles and from 95 to 90 parts by volume of the aqueous liquid. The resulting mixture of the cation exchange resin and the sea water is continuously flowed away from the point of mixing in column 25 at a rate sufficient to maintain the resin particles suspended in the aqueous liquid while at the same time the resin sorbs calcium and magnesium ions from the sea water. The aqueous suspension is discharged from column 25 and is passed via conduit 30 into a separating zone or hydraulic cyclone 31 wherein the mixture is caused to flow in circular motion at a rate sufficient to separate softened water from the cation exchange resin particles by centrifugal action resulting from the circular flow of the materials in the hydraulic cyclone. The cation exchange resin together with a portion of the water, is discharged from the hydraulic cyclone 31 through a suitable outlet 32 and is fed into a holding vessel 33 from which it is continuously withdrawn and is passed via conduit 34 and conduit 35, 35a or 35b into one or another of the regenerators units 27, 27a or 27b. The regenerators are employed in the process as a plurality of at least three similar units so that one of the regenerators can serve as a holding vessel for regenerated cation exchange resin which is continuously being withdrawn and fed to the adsorption column(s) while another of the regenerators is being filled with used cation exchange resin continuously withdrawn from holding vessels 33 and/or 36 and fed to the regenerator via conduits 34 and/or 37 and 35, 35a or 35b, and the remaining regenerator unit which is filled with used cation exchange resin, is being regenerated to the alkali metal salt form as is more fully hereinafter described.

The softened sea water is separately withdrawn or discharged from hydraulic cyclone 31 and is passed via conduit 38 into a second adsorption column 39 and into admixture with particles of the cation exchange resin in a form which sorbs calcium and magnesium ions from the water. The cation exchange resin is withdrawn from one of the regenerator units 27, 27a or 27b and is fed as a slurry consisting of from 40 to 60 percent by volume of the resin particles and from 60 to 40 percent by volume of water via conduit 28, 28a or 28b and conduits 29 and 40 into column 39 in proportions sufficient to form an aqueous suspension in said adsorption column consisting of from 5 to 10 percent by volume of the cation exchange resin particles and from 95 to 90 percent by volume of aqueous liquid. The aqueous suspension is continuously flowed away from the point of mixing in column 39 and is passed via conduit 41 into a hydraulic cyclone 42 wherein softened water is separated from the resin particles. The cation exchange resin particles are discharged from hydraulic cyclone 42 through an outlet 43 and are passed into holding vessel 36 from which the used cation exchange resin is withdrawn and passed via conduits 37 and 34 to one of the regenerator units 27, 27a or 27b via conduit 35, 35a or 35b, wherein the resin is regenerated and is re-employed in the process. The softened water is separately withdrawn from hydraulic cyclone 42 and is passed via a conduit 44 into holding vessel 45 having an outlet 46. The softened water is withdrawn from holding vessel 45 and fed via conduit 47 into a distilling zone 48 or a multistage evaporator, wherein the softened water is subjected to distillation to obtain a potable condensate and a liquid residue containing from 5 to 10 percent by weight of alkali metal salts. The distillate is passed via conduit 49 to condenser 50 wherein it is cooled and is withdrawn as potable water via conduit 51 and passed to storage or point of use. A liquid residue containing from 5 to 10 percent by weight of alkali metal salts is continuously withdrawn from distilling zone 48 via conduit 52 and can be passed to waste via conduit 53, when in excess of the amount required to regenerate the cation exchange resin, but in accordance with the invention is fed via conduit 52 and a conduit 54, 54a or 54b into one of the regenerator units 27, 27a or 27b and into contact with the used cation exchange resin to regenerate the cation exchange resin to the alkali metal salt form. The effluent regenerating solution is passed via conduits 55, 55a or 55b and conduit 56 to waste. The regenerated cation exchange resin is continuously withdrawn from one of the regenerator units 27, 27a or 27b and is passed via conduits 29 and 26 to column 25 or via conduits 29 and 40 into column 39 so as to continuously feed fresh or regenerated cation exchange resin into admixture with the water to be softened.

In an alternative procedure, the cation exchange resin can be withdrawn from holding vessel 36 and passed via a conduit 57 (dotted line) and conduit 26 into absorbing column 25 and thereby employed in two absorption steps in the process prior to its being regenerated and re-employed in the process, but such procedure is less satisfactory than is the feeding of new or regenerated cation exchange resin into admixture with the water to be softened.

In carrying out the method herein described for making potable water from sea water, the magnesium which is removed from the sea water by contact with the cation exchange resin in the softening step can advantageously be recovered in the form of magnesium chloride from the effluent liquid obtained in regenerating the used cation exchange resin by a procedure which consists in adding or dissolving sodium chloride in the residue solution withdrawn from the distilling or evaporating zone, in amount sufficient to form an aqueous concentrated to saturated solution, e.g. a solution containing from 15 to 26 percent by weight of sodium chloride, and employing this solution for regenerating the used cation exchange resin. By employing a concentrated to saturated aqueous sodium chloride solution as the regenerant solution in one or more contacting stages with the spent cation exchange resin and collecting successive fractions of the effluent liquid there is obtained a fraction containing magnesium chloride in a concentration from which it can economically be recovered by usual evaporation and crystallization procedures.

The following example illustrates practice of the invention, but is not to be construed as limiting its scope.

*Example*

In making potable water from sea water, an arrangement of the principal major elements of apparatus similar to that shown in FIG. 2 of the drawing is assembled comprising two 6 foot internal diameter by 30 feet high adsorption columns, two 6 foot diameter hydraulic cyclones, two 10 foot diameter by 12 feet high conical bottom holding vessels, three 10 foot diameter by 20 feet high regenerating columns, a 2000 gallon per minute multistage evaporator with suitable condenser, together with valves, pumps and other control means appropriately placed in the arrangement of apparatus to control and regulate the flow of materials as desired in the process, and 1200 cubic feet of Dowex 50, a cation exchange resin consisting of a sulfonated copolymer of 92 percent by weight of styrene and 8 percent of divinylbenzene in the form of the sodium salt and of particles of sizes between 50 and 100 mesh per inch as determined by U.S. standard screens. The cation exchange resin has an exchange capacity corresponding to 41.5 kilograins of calcium carbonate per cubic foot of a bed of the wet resin particles.

A stream of sea water containing 9,050 parts by weight of sodium, 383 parts by weight of calcium and 1082 parts by weight of magnesium per million parts by weight of the sea water, is fed at a rate of 3,250 gallons per minute into the adsorption column 25 and into admixture with particles of the cation exchange resin also fed to the adsorption column 25 as a slurry consisting of 60 percent by volume of the resin particles and 40 percent by volume of water, which slurry is fed to the column at a rate of 500 gallons per minute to form an aqueous suspension in the adsorption column 25 consisting of 8 percent by volume of the resin particles and 92 percent by volume of the aqueous liquid. The mixture of the materials is continuously flowed away from the point of mixing and is passed into a hydraulic cyclone 31 wherein the mixture is caused to flow in circular motion at a rate which separates the softened sea water from the cation exchange resin particles by centrifugal action resulting from the circular motion of the materials in the hydraulic cyclone. The cation exchange resin particles are discharged from the hydraulic cyclone, together with a portion of the water, as a slurry consisting of 60 percent by volume of resin particles and 40 percent of water and at a rate corresponding to 500 gallons of the slurry per minute. The slurry of the used cation exchange resin and water is continuously fed to the regenerators. The softened sea water containing about 9,840 parts by weight of sodium, 232 parts by weight of calcium and 788 parts by weight of magnesium per million parts by weight of the water is withdrawn from the hydraulic cyclone 31 and is fed into a second absorption column 39 and into admixture with particles of the cation exchange resin fed to the column 39 at a rate of 300 gallons of the resin particles per minute and as a slurry consisting of 60 percent by volume of the resin particles and 40 percent by volume of water. The resulting mixture is continuously flowed away from the point of mixing and is passed into a second hydraulic cyclone 42 wherein softened water is separated from the resin particles in the manner previously described. The cation exchange resin particles are discharged from the second hydraulic cyclone 42, together with water, into a holding vessel 36 from which it is withdrawn and fed to the regenerators. Softened sea water containing 10,520 parts by weight of sodium, 83 parts by weight of calcium and 490 parts by weight of magnesium per million parts by weight of the water is withdrawn from the second hydraulic cyclone 42 at a rate of 3250 gallons per minute and is preferably passed to a storage vessel 45 from which it is withdrawn and fed to a distilling column 48 or an evaporator, suitably a multistage evaporator. In the evaporator, the softened sea water is distilled to obtain potable condensate at a rate of about 2235 gallons per minute and a liquid residue consisting of a saline concentrate containing about 266 parts by weight of calcium, 1570 parts by weight of magnesium and 33,700 parts by weight of sodium (about 8.6 percent by weight of NaCl) per million parts by weight of the residue solution. The saline liquid residue solution is withdrawn from the distilling zone or evaporator and is fed into contact with a bed of the used cation exchange resin in the regenerating zone and is used to regenerate the used resin to the sodium salt form. The saline residue solution contains sodium chloride in amount sufficient to regenerate about 60 cubic feet of the used cation exchange resin per minute at the accumulated rate of 1015 gallons per minute of the residue solution, and when employing an operating amount of the saline residue solution corresponding to about 12 pounds of sodium chloride per cubic foot of the used resin, i.e. about twice the amount of sodium chloride theoretically required, to regenerate the used cation exchange resin. The method is carried out in continuous manner and with little or no scaling or build-up of scale in the evaporator or distilling column to produce a potable condensate from sea water as herein described.

We claim:
1. A method for making potable water from an aqueous brine having a mixture of inorganic salts, comprising a major proportion of alkali metal salts and a minor proportion of at least one water-hardening metal salt selected from the class consisting of calcium and magnesium salts, dissolved therein, which method comprises passing said brine in series through at least one ion exchange chamber while feeding discrete particles of a cation exchange resin salt containing alkali metal ions into said chamber at a rate such as to form an aqueous suspension containing from 5 to 10 percent by volume of the cation exchange resin, whereby water-hardening ions are removed by ion exchange from the brine, causing the suspension to flow from said chamber into a separating zone wherein the suspension is caused to flow in a circular motion at a rate sufficient to cause separation of the resulting softened salt-containing brine from the ion exchange resin in a continuous manner, passing the ion exchange resin to a regenerating zone, passing the softened brine to a distilling zone and distilling a portion of the water therefrom to obtain a condensate of potable water and a relatively concentrated residue solution containing from 5 to 10 percent by weight of alkali metal salts, passing a regenerant liquid comprising the residue solution into contact with the used cation exchange resin in said regenerating zone, whereby the cation exchange resin is regenerated to the alkali metal salt form, and re-employing the regenerated cation exchange resin in the process.

2. A method according to claim 1, wherein the brine is passed through a plurality of ion exchange chambers.

3. A method according to claim 1, wherein the brine is sea water.

4. A method according to claim 1, wherein the cation exchange resin is a sulfonated insoluble cross-linked copolymer of styrene and divinylbenzene.

5. A method for making potable water from sea water which comprises (A) softening sea water by removing calcium and magnesium from the water with a cation exchange resin in a plurality of successive steps which consist in (1) feeding sea water and discrete particles of a cation exchange resin in a form which sorbs calcium and magnesium ions from the sea water into admixture with one another in a first adsorption zone in proportions sufficient to form an aqueous suspension containing from 5 to 10 percent by volume of the resin particles, continuously flowing the aqueous suspension away from the point of mixing in the adsorption zone at a rate which maintains the resin particles suspended in the liquid, whereby calcium and magnesium ions are removed by ion exchange from the sea water, continuously flowing the aqueous suspension into a separating zone wherein the suspension is caused to flow in circular motion at a rate sufficient to separate aqueous liquid from the resin particles in a continuous manner by centrifugal action resulting from the circular motion of the flowing materials, passing the cation exchange resin to a regenerating zone, passing the softened sea water to another adsorption zone and, (2) repeating the sequence of operations described in step (1) on the softened sea water from the separating zone for a plurality of times sufficient to produce softened sea water having not more than 800 parts of hardness caused by not more than 100 parts by weight of calcium and not more than 700 parts by weight of magnesium contained therein per million parts by weight of the water, (B) continuously feeding the softened sea water containing not more than 800 parts of hardness per million parts by weight of the water into a distilling zone and distilling a portion of the water therefrom to obtain a condensate of potable water and a relatively concentrated liquid residue solution consisting essentially of water containing from 5 to 10 percent by weight of water-soluble alkali metal salts, continuously withdrawing said liquid residue from the distilling zone, and (C) continuously passing a liquid regenerant comprising the aqueous liquid residue solution into contact with the used cation exchange resin containing resin particles in the calcium and magnesium form in the regenerating zone, whereby the cation exchange resin is regenerated to the alkali metal form and re-employing the regenerated cation exchange resin in the process.

6. A method for recovering potable water and magnesium chloride from sea water which method comprises passing sea water in series through at least one ion exchange chamber while feeding discrete particles of a cation exchange resin containing alkali metal ions into said chamber at a rate such as to form an aqeous suspension containing from 5 to 10 percent by volume of the cation exchange resin, whereby calcium and magnesium ions are removed by ion exchange from the sea water, causing the suspension to flow from said chamber into a separating zone wherein the suspension is caused to flow in circular motion at a rate sufficient to cause separation of the resulting softened sea water from the ion exchange resin in a continuous manner, passing the ion exchange resin to a regenerating zone, passing the softened sea water to a distilling zone and distilling a portion of the water therefrom to obtain a condensate of potable water and a residue solution containing from 5 to 10 percent by weight of alkali-metal salts, adding to said residue solution sodium chloride in amount sufficient to form an aqueous 15 percent by weight to a saturated aqueous sodium chloride solution, passing the resulting residue solution into contact with the used cation exchange resin in said regenerating zone, whereby the cation exchange resin is regenerated with formation of a magnesium salt solution containing the magnesium in higher concentration than in the residue solution, collecting said magnesium salt solution as effluent liquid and recovering magnesium chloride therefrom, and re-employing the regenerated cation exchange resin in the process for softening a further quantity of the sea water.

7. A method according to claim 6, wherein the sea water is passed through a plurality of ion exchange chambers.

8. A method according to claim 6, wherein the cation exchange resin is a sulfonated insoluble cross-linked copolymer of styrene and divinylbenzene.

References Cited in the file of this patent

UNITED STATES PATENTS

| | | |
|---|---|---|
| 52,476 | Wheeler | Feb. 6, 1866 |
| 1,740,199 | Nordell | Dec. 17, 1929 |
| 2,387,898 | Grebe et al. | Oct. 30, 1945 |
| 2,441,361 | Kirgan | May 11, 1948 |
| 2,671,714 | McIlhenny et al. | Mar. 9, 1954 |
| 2,696,465 | Kittredge | Dec. 7, 1954 |
| 2,733,196 | Hillier et al. | Jan. 31, 1956 |
| 2,748,064 | Myers | May 29, 1956 |
| 2,767,140 | Fitch | Oct. 16, 1956 |
| 2,776,258 | Gilliland | Jan. 1, 1957 |
| 2,897,051 | McIlhenny et al. | July 28, 1959 |

FOREIGN PATENTS

| | | |
|---|---|---|
| 539,883 | Canada | Apr. 23, 1957 |
| 791,364 | Great Britain | Feb. 26, 1958 |
| 783,483 | Great Britain | Sept. 25, 1957 |

OTHER REFERENCES

Tangel and Brison: "Wet Cyclones," Chem. Eng., vol. 62, No. 6, pages 234–8 (July 1955).